US012655007B1

(12) United States Patent
Xiang

(10) Patent No.: US 12,655,007 B1
(45) Date of Patent: Jun. 16, 2026

(54) THREADED CAP OPENER

(71) Applicant: Ying Xiang, Xiantao (CN)

(72) Inventor: Ying Xiang, Xiantao (CN)

(*) Notice: Subject to any disclaimer, the term of this patent is extended or adjusted under 35 U.S.C. 154(b) by 0 days.

(21) Appl. No.: 19/356,354

(22) Filed: Oct. 13, 2025

(30) Foreign Application Priority Data

Sep. 22, 2025 (CN) ......................... 202522036630.0

(51) Int. Cl.
*B67B 7/18* (2006.01)

(52) U.S. Cl.
CPC ...................................... *B67B 7/18* (2013.01)

(58) Field of Classification Search
CPC .... B67B 7/02; B67B 7/04; B67B 7/06; B67B 7/12; B67B 7/14; B67B 7/15; B67B 7/16; B67B 7/18; B67B 7/20; B67B 7/30; B67B 7/44
See application file for complete search history.

(56) References Cited

U.S. PATENT DOCUMENTS 2,031,420 A * 2/1936 Lebherz .................... B67B 7/18 81/3.4
4,085,632 A * 4/1978 Hogan ...................... B67B 7/18 81/3.25
6,105,468 A * 8/2000 Fohrman ................... B67B 7/44 81/3.4
D436,301 S * 1/2001 Savio ............................... D8/18
9,630,824 B1 * 4/2017 Roth .......................... B67B 7/18
11,472,686 B2 * 10/2022 Figa .......................... B67B 7/14
D1,068,423 S * 4/2025 Fang ................................ D8/40
2016/0304330 A1 * 10/2016 Cardinal .................. B67B 7/16

FOREIGN PATENT DOCUMENTS

CN 211712588 U 10/2020
CN 212893814 U 4/2021
CN 214935904 U 11/2021
CN 218698243 U 3/2023

* cited by examiner

*Primary Examiner* — Robert J Scruggs
(74) *Attorney, Agent, or Firm* — Nitin Kaushik

(57) ABSTRACT

The present disclosure discloses a threaded cap opener that includes: a fixing plate having a plurality of engaging members or a plurality of position-limiting posts fixedly disposed thereon; a cap opening assembly detachably connected to the fixing plate, wherein the cap opening assembly includes: a hand-held plate mechanism having a V-shaped through hole and a plurality of guide and latch slots or a plurality of position-limiting holes disposed therethrough respectively, with the plurality of engaging members detachably engaged with the corresponding guide and latch slots respectively or the plurality of position-limiting posts positioned and latched in the corresponding position-limiting holes respectively; a serrated mechanism securely disposed along an edge of the hand-held plate mechanism; a second serrated rack securely disposed on an edge of the through hole; and a magnetic attachment member securely disposed in the hand-held plate mechanism.

19 Claims, 7 Drawing Sheets

THREADED CAP OPENER

CROSS-REFERENCE TO RELATED APPLICATIONS

The application claims priority to Chinese patent application No. 2025220366300, filed on Sep. 22, 2025, the entire contents of which are incorporated herein by reference.

TECHNICAL FIELD

The present disclosure relates to the technical field of cap openers, in particular to a threaded cap opener.

BACKGROUND

In the prior art, there are mainly two types of threaded cap openers. The threaded cap openers of one type are fixed-installation threaded cap openers, which are fixedly installed on a cabinet or table. Once installed, they cannot be arbitrarily detached, and thus are inconvenient for users to use and operate. Furthermore, they are incapable of opening irregular-shaped caps with protruding top sections. The threaded cap openers of the other type are hand-held threaded cap openers. While being convenient for users to use and operate, they are prone to being lost as users tend to place them casually after use.

As disclosed in the utility model patent with publication number CN212893814U, a threaded cap opener is provided. It includes a plate-like base plate with a teardrop-shaped through opening disposed therein. On the inner wall of the opening that may contact a threaded cap, only one side is provided with a high-friction surface. Although this technical solution is convenient for user operation, this threaded cap opener is prone to being lost due to casual placement by users after use. Therefore, a threaded cap opener is provided to address the above-mentioned issues.

SUMMARY

One of the purposes of the present disclosure is to provide a threaded cap opener so as to solve the problem that the existing threaded cap openers cannot function in both a fixed mode and a hand-held mode.

A threaded cap opener of the present disclosure can be achieved by the following technical solutions.

A threaded cap opener of the present disclosure includes: a fixing plate having a plurality of engaging members fixedly disposed thereon; and a cap opening assembly, which is detachably engaged with the fixing plate via the plurality of the engaging members, wherein the cap opening assembly includes: a hand-held plate mechanism, which is a V-shaped body with a V-shaped cavity and has a V-shaped through hole and a plurality of guide and latch slots disposed therethrough respectively, with the plurality of engaging members detachably engaged with the corresponding guide and latch slots respectively; a serrated mechanism securely disposed along an edge of the hand-held plate mechanism; and a second serrated rack securely disposed on an edge of the through hole.

In one implementation herein, the cap opening assembly further includes a magnetic attachment member that is securely disposed in the hand-held plate mechanism.

In one implementation herein, the hand-held plate mechanism includes a hand-held plate body and a clamping strip securely disposed on the hand-held plate body, and the clamping strip positions and secures the serrated mechanism and the magnetic attachment member disposed in the hand-held plate body.

In one implementation herein, the hand-held plate body includes a V-shaped main plate, and the plurality of guide and latch slots are respectively disposed through the main plate; a first sidewall and a second sidewall are fixedly disposed on the main plate respectively, and the serrated mechanism is securely disposed on the first sidewall.

In one implementation herein, the first sidewall is provided with a plurality of guide posts disposed fixedly, and the serrated mechanism is guided and mounted on the first sidewall via the plurality of guide posts.

In one implementation herein, a first anti-slip member and a second anti-slip member are respectively disposed on the outsides of the first sidewall and the second sidewall, and the first anti-slip member and the second anti-slip member employ anti-slip stripes or anti-slip bumps.

In one implementation herein, a receiving slot is disposed on an edge of the through hole, and the second serrated rack is securely disposed in the receiving slot.

In one implementation herein, the serrated mechanism includes two first serrated racks disposed relatively parallel to each other and a connecting plate disposed between the two first serrated racks.

In one implementation herein, the fixing plate is securely mounted by screw structures, strong adhesive bonding, snap-fit structures or strong attraction.

In one implementation herein, a plurality of first fixing holes are disposed through the fixing plate, and fastening screws pass through the plurality of first fixing holes in sequence to securely mount the fixing plate.

A threaded cap opener of the present disclosure includes: a fixing plate having a plurality of position-limiting posts fixedly disposed thereon, the fixing plate being an iron member or an iron-containing member; and a cap opening assembly, which is detachably magnetically attached to the fixing plate, wherein the cap opening assembly includes: a hand-held plate mechanism, which is a V-shaped body with a V-shaped cavity and has a V-shaped through hole and a plurality of position-limiting holes disposed therethrough respectively, with the plurality of position-limiting posts positioned and latched in the corresponding position-limiting holes respectively; a serrated mechanism securely disposed along an edge of the hand-held plate mechanism; a second serrated rack securely disposed on an edge of the through hole; and a magnetic attachment member that is securely disposed in the hand-held plate mechanism and detachably magnetically attached to the fixing plate.

In one implementation herein, the hand-held plate mechanism includes a hand-held plate body and a clamping strip securely disposed on the hand-held plate body, and the clamping strip positions and secures the serrated mechanism and the magnetic attachment member disposed in the hand-held plate body.

In one implementation herein, the hand-held plate body includes a V-shaped main plate, and the plurality of guide and latch slots are respectively disposed through the main plate; a first sidewall and a second sidewall are fixedly disposed on the main plate respectively, and the serrated mechanism is securely disposed on the first sidewall.

In one implementation herein, the first sidewall is provided with a plurality of guide posts disposed fixedly, and the serrated mechanism is guided and mounted on the first sidewall via the plurality of guide posts.

In one implementation herein, a first anti-slip member and a second anti-slip member are respectively disposed on the outsides of the first sidewall and the second sidewall.

In one implementation herein, the first anti-slip member and the second anti-slip member employ anti-slip stripes or anti-slip bumps.

In one implementation herein, a receiving slot is disposed on an edge of the through hole, and the second serrated rack is securely disposed in the receiving slot.

In one implementation herein, the serrated mechanism includes two first serrated racks disposed relatively parallel to each other and a connecting plate disposed between the two first serrated racks.

In one implementation herein, the fixing plate is securely mounted by screw structures, strong adhesive bonding, snap-fit structures or strong attraction.

In one implementation herein, a plurality of first fixing holes are disposed through the fixing plate, and fastening screws pass through the plurality of first fixing holes in sequence to securely mount the fixing plate.

Compared with those in the prior art, the threaded cap opener of the present disclosure has the following beneficial effects.

In the threaded cap opener of the present disclosure, the cap opening assembly is securely mounted on the fixing plate through the detachable engagement between the engaging members and the guide and latch slots or the detachable magnetic attachment of the magnetic attachment member to the fixing plate, and then a large-sized threaded cap may be set between the serrated mechanism and the second sidewall and opened through the cooperation therebetween, such that cap opening operations in the fixed mode are enabled; after the cap opening assembly is detached from the fixing plate, a large-sized threaded cap may be set between the serrated mechanism and the second sidewall and opened through the cooperation therebetween, or a small-sized cylindrical threaded cap or a small-sized irregular-shaped threaded cap may be set between the second serrated rack and the corresponding side wall of the through hole and opened through the cooperation therebetween, such that cap opening operations in the hand-held mode are enabled. As a result, the problem that the existing threaded cap openers cannot function in both a fixed mode and a hand-held mode is solved. At the same time, since magnetic attachment to iron furniture or household appliances can be enabled through the magnetic attachment member securely disposed in the cap opening assembly, the storage of the cap opening assembly is convenient and the risk of being lost of the cap opening assembly is reduced to some extent.

BRIEF DESCRIPTION OF DRAWINGS

To more clearly illustrate the technical solutions in embodiments of the present disclosure, the accompanying drawings required for illustration of the embodiments will be briefly introduced below. It should be understood that, the following drawings only illustrate some embodiments of the present disclosure and therefore should not be construed as limitation on the scope of the present disclosure. For those of ordinary skills in this art, other relevant drawings can be obtained based on these drawings without paying creative efforts.

DETAILED DESCRIPTION OF THE EMBODIMENTS

To make the purposes, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are only some, not all, of the embodiments of the present disclosure. The components of the embodiments of the present disclosure, which are generally described and illustrated in the accompanying drawings herein, may be arranged and designed in various different configurations.

Therefore, the following detailed description of the embodiments of the present disclosure provided in the accompanying drawings is not intended to limit the scope claimed by the present disclosure, but merely explains selected embodiments of the present disclosure. Based on the embodiments of the present disclosure, all other embodiments obtained by those of ordinary skills in the art without paying creative efforts shall fall within the protection scope of the present disclosure.

First Embodiment

Figure 1:
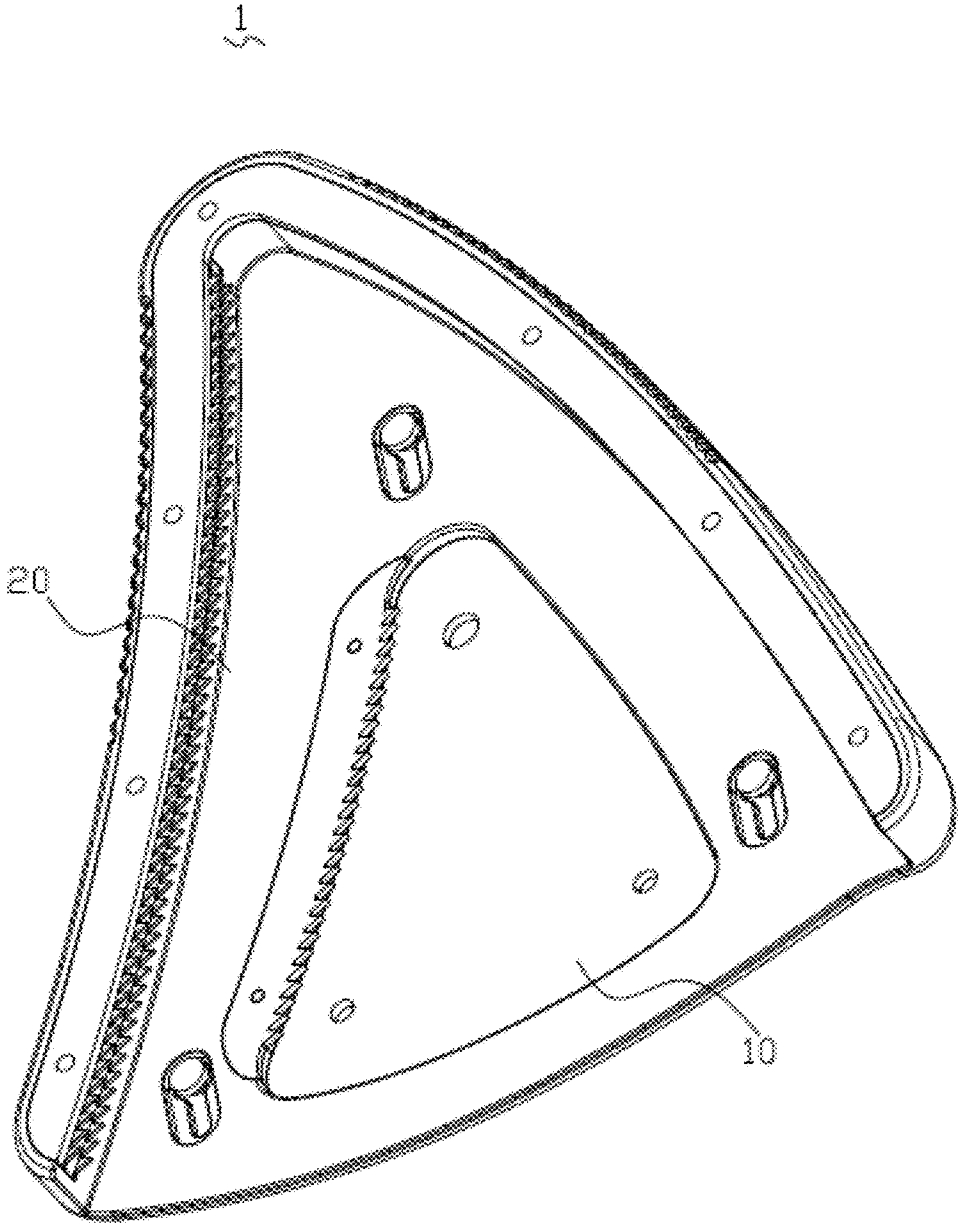
FIG. 1 is a schematic three-dimensional structural diagram of a threaded cap opener in a first embodiment of the present disclosure.
Figure 2:
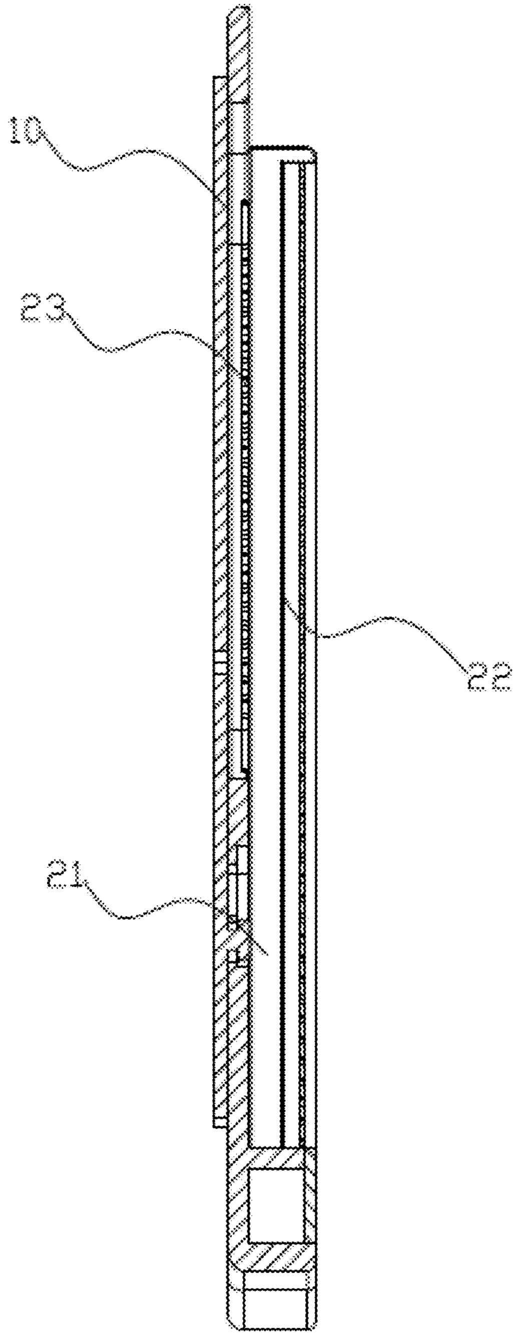
FIG. 2 is a schematic cross-sectional structural diagram of the threaded cap opener in the first embodiment of the present disclosure.
Figure 3:
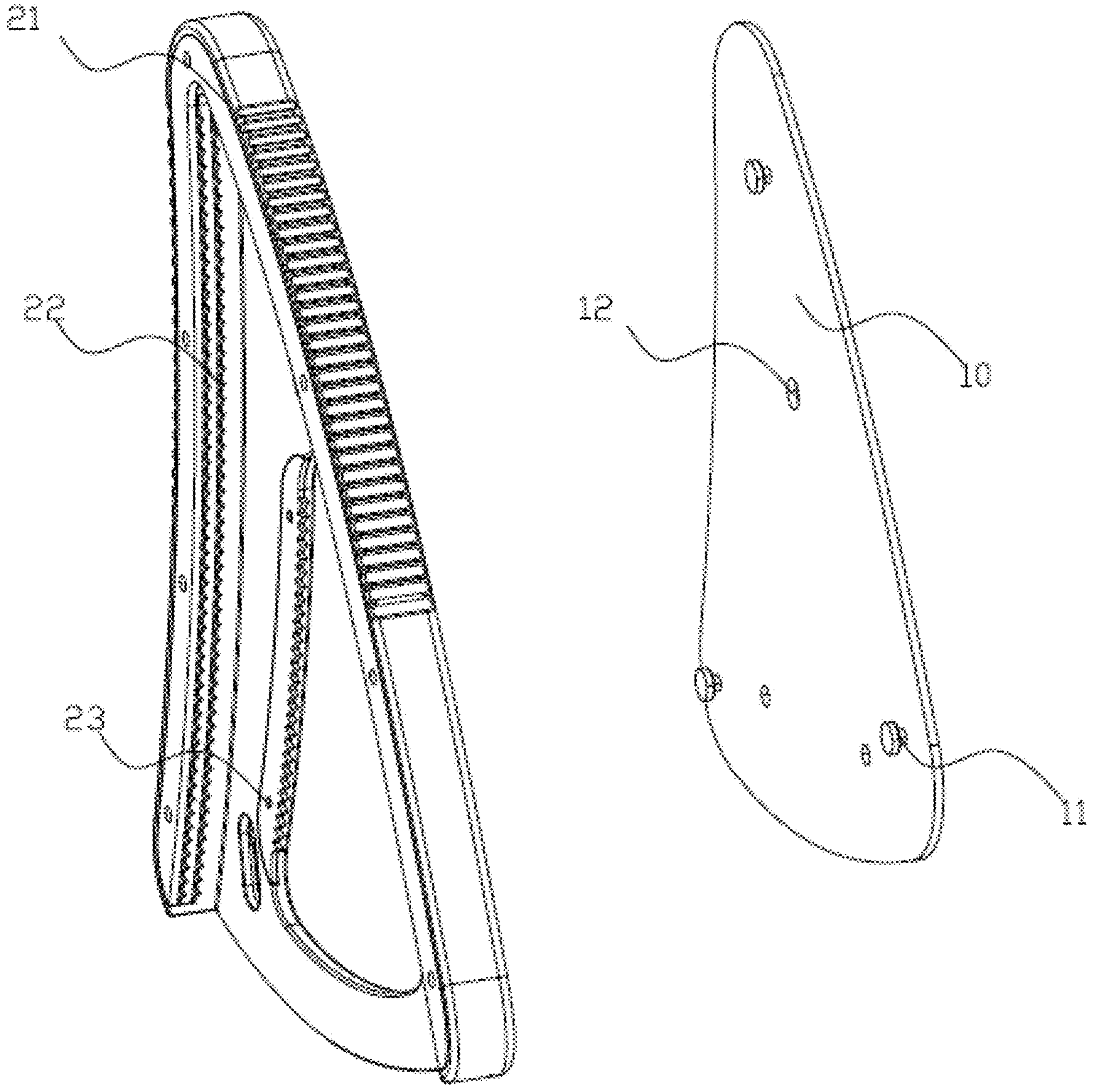
FIG. 3 is a schematic exploded structural diagram of the threaded cap opener in the first embodiment of the present disclosure, including illustration of a cap opening assembly.

Referring to FIGS. 1 to 3, in this embodiment, a threaded cap opener 1 of the present disclosure includes a fixing plate 10 and a cap opening assembly 20. The fixing plate 10 is securely mounted on a mounting surface including, but not limited to, a cabinet and a table. The cap opening assembly 20 is detachably engaged with the fixing plate 10 and can be used to open threaded caps of different sizes or shapes. When the cap opening assembly 20 is securely engaged with the fixing plate 10, it can be used for cap opening operation without being grasped by hand, and when the cap opening assembly 20 is detached from the fixing plate 10, it can be held by hand for cap opening operation, such that the threaded cap opener 1 can to be switched between a fixed mode and a hand-held mode.

Referring to FIGS. 1 to 3, in this embodiment, a plurality of engaging members 11 are fixedly disposed on the side of the fixing plate 10 opposite to the cap opening assembly 20, and the cap opening assembly 20 is detachably engaged with the fixing plate 10 via the plurality of engaging members 11. A plurality of first fixing holes 12 are disposed through the fixing plate 10, and fastening screws 25 pass through the plurality of first fixing holes 12 in sequence to fix the fixing plate 10 on the mounting surface. In other embodiments, the fixing plate 10 may also be mounted on the mounting surface by strong adhesive bonding, snap-fit engagement or strong attraction.

Referring to FIGS. 1 to 4, in this embodiment, the cap opening assembly 20 includes a hand-held plate mechanism 21, a serrated mechanism 22, a second serrated rack 23, and a magnetic attachment member 24. The hand-held plate mechanism 21 is a V-shaped body with a V-shaped cavity, and has a V-shaped through hole 21111 disposed therethrough. The serrated mechanism 22 is securely disposed along an edge of the hand-held plate mechanism 21, and can be used to open different large-sized threaded caps. The second serrated rack 23 is securely disposed on an edge of the through hole 21111. Through the cooperation between the second serrated rack 23 and the through hole 21111, different small-sized cylindrical threaded caps or small-sized irregular-shaped threaded caps can be opened, such that the cap opening adaptability of the threaded cap opener 1 can be enhanced. The magnetic attachment member 24 is securely disposed in the hand-held plate mechanism 21, and enables the cap opening assembly 20 to be detachably magnetically attached to iron-containing furniture or household appliances including, but not limited to, an iron door, a refrigerator or a microwave oven, thereby effectively preventing loss of the cap opening assembly 20.

Figure 4:
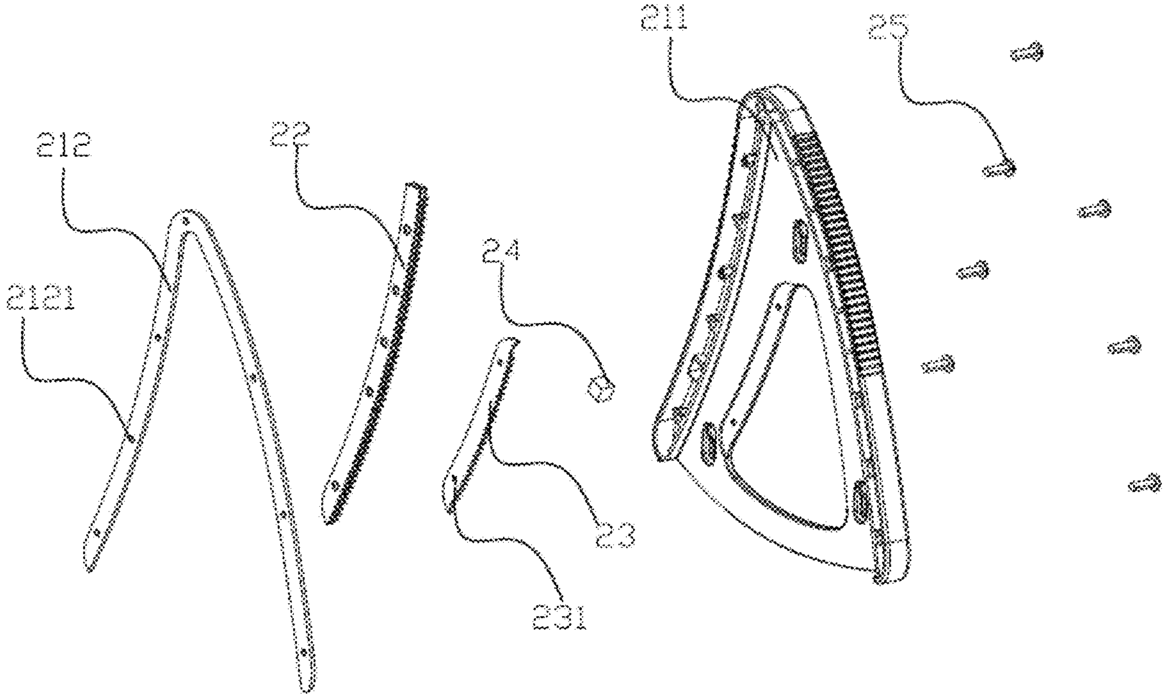
FIG. 4 is a schematic exploded structural diagram of the cap opening assembly shown in FIG. 3, including illustration of a hand-held plate body and a serrated mechanism.

Referring to FIG. 4, in this embodiment, the hand-held plate mechanism 21 includes a hand-held plate body 211 and a clamping strip 212. The hand-held plate body 211 is a body to be held by hand. The clamping strip 212 is securely disposed on one side of the hand-held plate body 211, and positions and secures the serrated mechanism 22 and the magnetic attachment member 24 that are disposed on the hand-held plate body 211, thereby preventing the serrated mechanism 22 and the magnetic attachment member 24 from falling off from the hand-held plate body 211. Specifically, the hand-held plate body 211 is a plastic member, while the clamping strip 212 is a metallic member.

Figure 5:
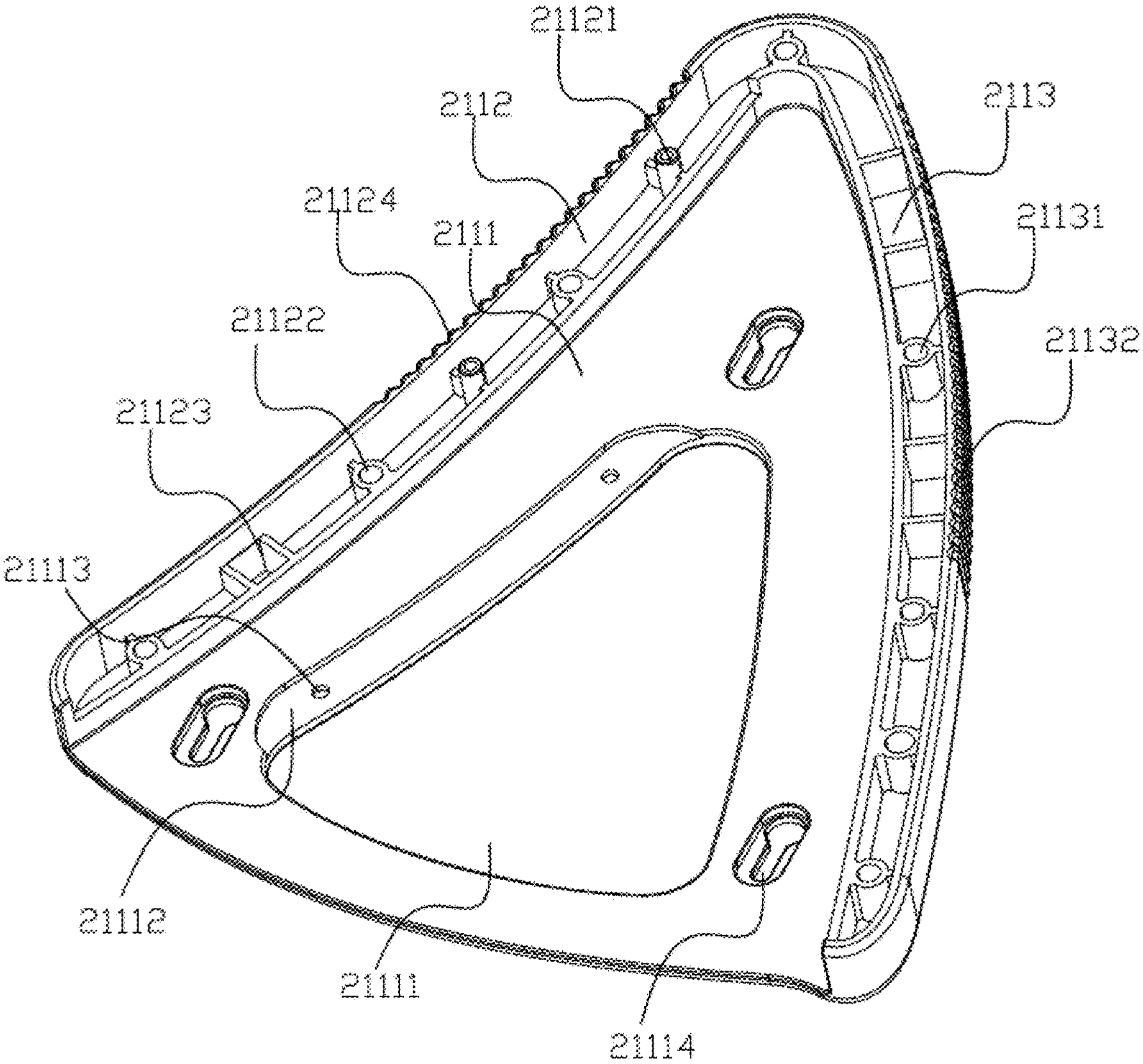
FIG. 5 is a schematic three-dimensional structural diagram of the hand-held plate body shown in FIG. 4.

Referring to FIGS. 4 and 5, in this embodiment, the hand-held plate body 211 includes a main plate 2111, a first sidewall 2112, and a second sidewall 2113. The main plate 2111 is a V-shaped plate, and the through hole 21111 is disposed through the main plate 2111 at a fixed position. The first sidewall 2112 and the second sidewall 2113 are fixedly disposed on two edges of the main plate 2111 respectively, and the serrated mechanism 22 is securely disposed on the first sidewall 2112, such that a large-sized threaded cap may be set between the serrated mechanism 22 and the second sidewall 2113 and be opened by the cooperation therebetween. The clamping strip 212 is securely disposed on the first sidewall 2112 and the second sidewall 2113. Specifically, the main plate 2111, the first sidewall 2112 and the second sidewall 2113 are integrally molded.

As shown in FIG. 5, specifically, a receiving slot 21112 is disposed on an edge of the through hole 21111, and the second serrated rack 23 is securely disposed in the receiving slot 21112. The second serrated rack 23 cooperates with the corresponding side wall of the through hole 21111 to open a small-sized cylindrical threaded cap or a small-sized irregular-shaped threaded cap set therebetween. A plurality of second fixing holes 21113 are disposed through the bottom of the receiving slot 21112, and fastening screws 25 pass through the plurality of second fixing holes 21113 to securely mount the second serrated rack 23 in the receiving slot 21112. A plurality of guide and latch slots 21114 are further disposed through the main plate 2111, and the plurality of engaging members 11 are detachably engaged with the corresponding guide and latch slots 21114 respectively, such that the cap opening assembly 20 is securely mounted to the fixing plate 10.

Referring to FIG. 5, specifically, the first sidewall 2112 is provided with a plurality of guide posts 21121 disposed fixedly. The serrated mechanism 22 is mounted on the first sidewall 2112 through the guidance of the plurality of guide posts 21121. The first sidewall 2112 is provided with a plurality of through holes as third fixing holes 21122. Fastening screws 25 respectively pass through the plurality of third fixing holes 21122, and securely threadedly connect with the clamping strip 211, enabling the clamping strip 212 to be securely mounted to the main plate 211. The first sidewall 2112, the second sidewall 2113 or each of them is provided with a receiving cavity 21123 and the magnetic attachment member 24 is disposed in the receiving cavity 21123. The magnetic attachment member 24 is held in place by the receiving cavity 21123. A first anti-slip member 21124 is disposed on the outside of the first sidewall 2112 to increase the friction between the user's fingers and the first sidewall 2112. The first anti-slip member 21124 may employ anti-slip stripes or anti-slip bumps. In this embodiment, the first anti-slip member 21124 employs anti-slip stripes.

As shown in FIG. 5, specifically, the second sidewall 2113 is provided with a plurality of through holes as fourth fixing holes 21131. Fastening screws 25 securely threadedly connect with the clamping strip 212 through the plurality of fourth fixing holes 21131 respectively, enabling the clamping strip 212 to be securely mounted to the main plate 211. A second anti-slip member 21132 is disposed on the outside of the second sidewall 2113 to increase the friction between the user's fingers and the second sidewall 2113. The second anti-slip member 21132 may employ anti-slip stripes or anti-slip bumps. In this embodiment, the second anti-slip member 21132 employs anti-slip stripes.

Referring to FIGS. 1, 2 and 4, in this embodiment, the clamping strip 212 is a V-shaped stainless steel member, which has a plurality of fifth fixing holes 2121 disposed therethrough. The positions of the plurality of fifth fixing holes 2121 respectively match the positions of the corresponding third fixing holes 21122 and fourth fixing holes 21131. The fastening screws 25 are securely threadedly connected with the corresponding fifth fixing holes 2121 through the third fixing holes 21122 or the fourth fixing holes 21131, thereby securely mounting the clamping strip 212 to the main plate 211.

Referring to FIGS. 1, 2, 3, 4 and 6, in this embodiment, the serrated mechanism 22 adopts a double-layer serrated structure, which includes two first serrated racks 221 and a connecting plate 222. The two first serrated racks 221 are disposed relatively parallel to each other. The connecting plate 222 is disposed between the two first serrated racks 221. The risk of slipping during cap opening is greatly reduced through the cooperation between the two first serrated racks 221. In other embodiments, the serrated mechanism 22 may also adopt a three-layer serrated structure or another multi-layer serrated structure.

Figure 6:
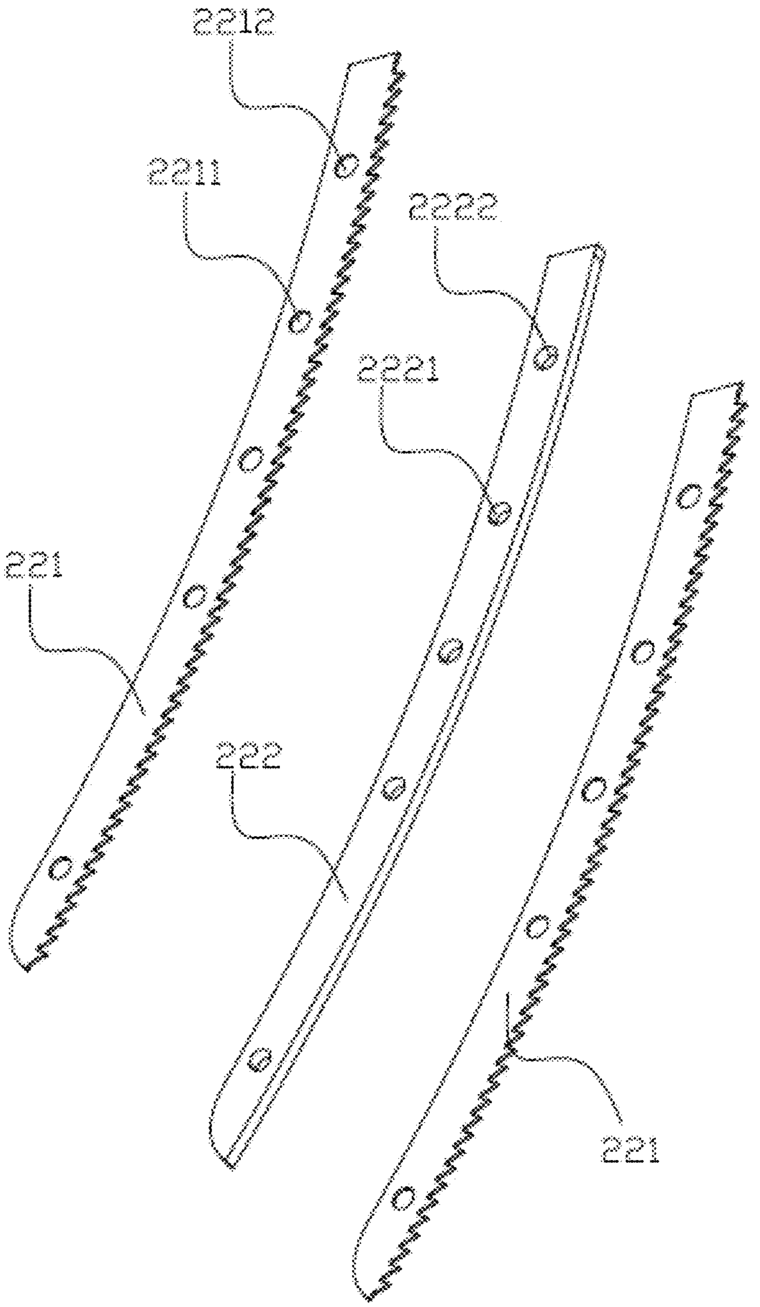
FIG. 6 is a schematic exploded structural diagram of the serrated mechanism shown in FIG. 4.

Referring to FIG. 6, specifically, a plurality of first guide holes 2211 and a plurality of sixth fixing holes 2212 are respectively disposed through each of the first serrated racks 221. The positions of the plurality of first guide holes 2211 match the positions of the corresponding guide posts 21121, and the guide posts 21121 can pass through the corresponding first guide holes 2211. The positions of the plurality of sixth fixing holes 2212 match the positions of the corresponding third fixing holes 21122 respectively. Specifically, a plurality of second guide holes 2221 and a plurality of seventh fixing holes 2222 are disposed respectively through the connecting plate 222. The positions of the plurality of second guide holes 2221 match the positions of the corresponding first guide holes 2211, and the guide posts 21121 can pass through the corresponding first guide holes 2211 and second guide holes 2221. The positions of the plurality of seventh fixing holes 2222 match the positions of the corresponding sixth fixing holes 2212 respectively.

Referring to FIGS. 1 to 4, in this embodiment, a plurality of eighth fixing holes 231 are disposed through the second serrated rack 23. The positions of the plurality of eighth fixing holes 231 match the positions of the corresponding second fixing holes 21112. The fastening screws 25 pass through the second fixing holes 21112 and are securely threadedly connected with the eighth fixing holes 231, thereby securely mounting the second serrated rack 23 to the hand-held plate mechanism 21. The magnetic attachment member 24 employs a magnet, which is securely disposed in the receiving cavity 21123.

Second Embodiment

Figure 7:
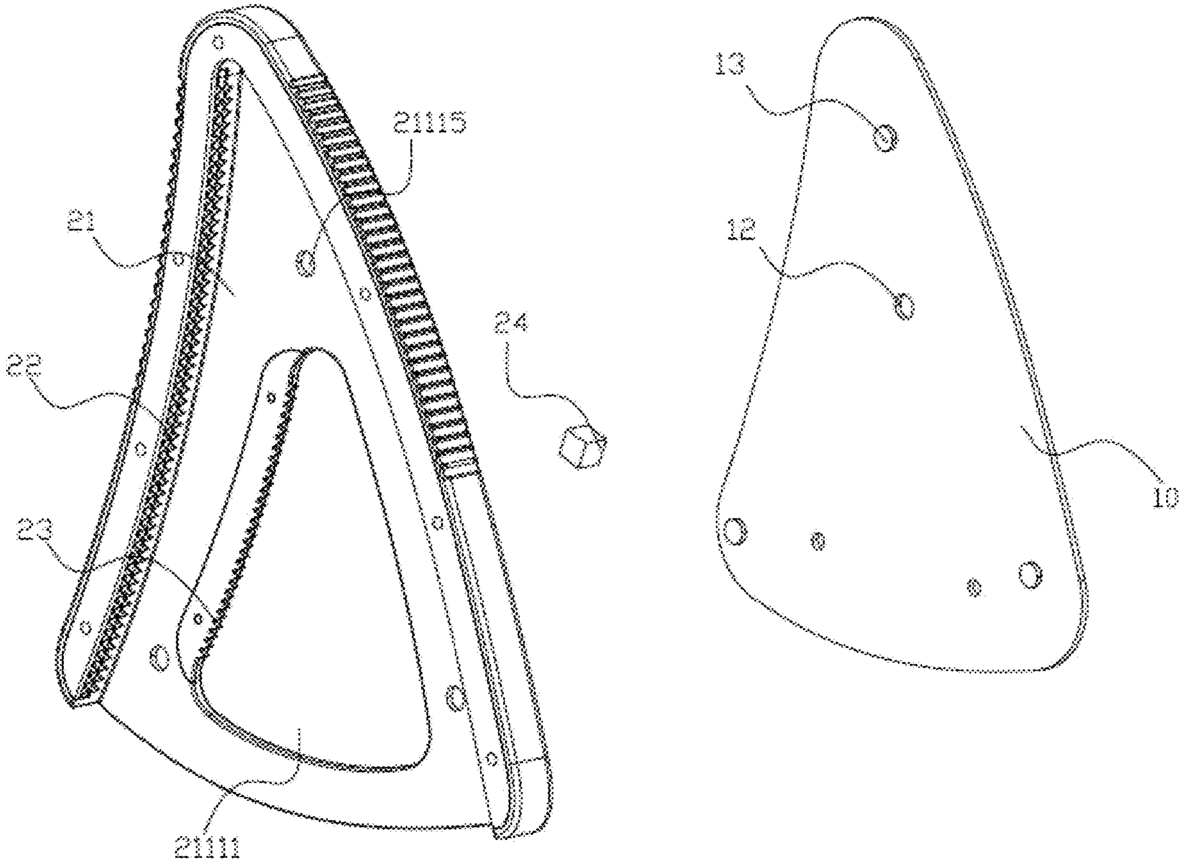
FIG. 7 is a schematic exploded structural diagram of a threaded cap opener in a second embodiment of the present disclosure.

Referring to FIG. 7, in this embodiment, a threaded cap opener 1 of the present disclosure includes a fixing plate 10 and a cap opening assembly 20. The fixing plate 10 is securely mounted on a mounting surface including, but not limited to, a cabinet and a table. The cap opening assembly 20 is detachably magnetically attached to the fixing plate 10, and can be used to open threaded caps of different sizes or shapes. When the cap opening assembly 20 is securely magnetically attached to the fixing plate 10, it can be used to open caps without being grasped by hand, and when the cap opening assembly 20 is detached from the fixing plate 10, it can be held by hand for cap opening operation, such that the threaded cap opener 1 can be switched between a fixed mode and a hand-held mode.

Referring to FIG. 1 to 3, in this embodiment, the fixing plate 10 is an iron member or an iron-containing member, and a plurality of position-limiting posts 13 are fixedly disposed on the side of the fixing plate 10 opposite to the cap opening assembly 20. The cap opening assembly 20 is positioned, and connected to and in contact with the fixing plate 10 via the plurality of position-limiting posts 13. A plurality of first fixing holes 12 are disposed through the fixing plate 10, and fastening screws pass through the plurality of first fixing holes 12 in sequence to securely dispose the fixing plate 10 on the mounting surface. In other embodiments, the fixing plate 10 may also be securely disposed on the mounting surface by strong adhesive bonding, snap-fit engagement or strong attraction.

As shown in FIG. 7, in this embodiment, the cap opening assembly 20 includes a hand-held plate mechanism 21, a serrated mechanism 22, a second serrated rack 23 and a magnetic attachment member 24. The hand-held plate mechanism 21 is a V-shaped body with a V-shaped cavity, and has a V-shaped through hole 21111 disposed therethrough. The serrated mechanism 22 is securely disposed along an edge of the hand-held plate mechanism 21, and can be used to open different large-sized threaded caps. The second serrated rack 23 is securely disposed on an edge of the through hole 21111. Through the cooperation between the second serrated rack 23 and the through hole 21111, different small-sized cylindrical threaded caps or small-sized irregular-shaped threaded caps can be opened, such that the cap opening adaptability of the threaded cap opener 1 can be enhanced. The magnetic attachment member 24 is securely disposed in the hand-held plate mechanism 21, and can be detachably magnetically attached to the fixing plate 10. At the same time, the magnetic attachment member 24 enables the cap opening assembly 20 to be detachably magnetically attached to iron-containing furniture or household appliances including, but not limited to, an iron door, a refrigerator or a microwave oven, thereby effectively preventing loss of the cap opening assembly 20.

Referring to FIG. 7, in this embodiment, a plurality of position-limiting holes 21115 are disposed through the hand-held plate mechanism 21, and the plurality of position-limiting posts 13 are positioned and detachably latched in the corresponding position-limiting holes 21115 respectively, such that the cap opening assembly 20 is positioned and mounted to the fixing plate 10. At the same time, the magnetic attachment member 24 is magnetically attached to the fixing plate 10, enabling the cap opening assembly 20 to be quickly magnetically attached to the fixing plate 10.

It should be noted that, the specific working process of the threaded cap opener 1 of the present disclosure is as follows: when the threaded cap opener 1 needs to be used in the fixed mode, the cap opening assembly 20 is securely mounted on the fixing plate 10 through the detachable engagement between the engaging members 11 and the guide and latch slots 21114 or the detachable magnetic attachment of the magnetic attachment member 24 to the fixing plate 10, and then a large-sized threaded cap is set between the serrated mechanism 22 and the second sidewall 2113 and opened through the cooperation therebetween; when the threaded cap opener 1 needs to be used in the hand-held mode, the cap opening assembly 20 is detached from the fixing plate 10, then a large-sized threaded cap is set between the serrated mechanism 22 and the second sidewall 2113 and opened through the cooperation therebetween, or a small-sized cylindrical threaded cap or a small-sized irregular-shaped threaded cap is set between the second serrated rack 23 and the corresponding side wall of the through hole 21111 and opened through the cooperation therebetween, and after use the cap opening assembly 20 can be securely mounted to the fixing plate 10 again, or can be magnetically attached to iron furniture or household appliances through the magnetic attachment member 24.

The technical features of the above-described embodiments can be combined arbitrarily. To make the description concise, not all possible combinations of the technical features in the embodiments are described. However, any combination of these technical features should be considered to fall within the scope of this specification as long as there is no contradiction therein.

The above-mentioned embodiments only illustrate several implementations of the present disclosure. The description thereof is relatively specific and detailed, but it should not thereby be understood as limitation on the scope of the present disclosure. It is to be noted that, for those of ordinary skills in the art, a number of variations and improvements can be made without departing from the concept of the present disclosure, and these all fall within the scope claimed by the present disclosure. Therefore, the scope of the present disclosure should be defined by the appended claims.

What is claimed is:

1. A threaded cap opener, comprising:

a fixing plate having a plurality of engaging members fixedly disposed thereon; and a cap opening assembly, which is detachably engaged with the fixing plate via the plurality of the engaging members, wherein the cap opening assembly comprises:

a hand-held plate mechanism, which is a V-shaped body with a V-shaped cavity and has a V-shaped through hole and a plurality of guide and latch slots disposed therethrough respectively, with the plurality of engaging members detachably engaged with the corresponding guide and latch slots respectively;

a magnetic attachment member disposed in the hand-held plate mechanism;

a serrated mechanism securely disposed along an edge of the hand-held plate mechanism; and a second serrated rack securely disposed on an edge of the through hole;

wherein the hand-held plate mechanism comprises a clamping strip, at least one of the serrated mechanism and the magnetic attachment member is secured by the clamping strip.

2. The threaded cap opener of claim 1, wherein the hand-held plate mechanism further comprises a hand-held plate body, wherein the clamping strip securely disposed on the hand-held plate body, and the clamping strip positions and secures the serrated mechanism, and positions and secures the magnetic attachment member received in a receiving cavity of the hand-held plate body.

3. The threaded cap opener of claim 2, wherein the hand-held plate body comprises a V-shaped main plate, and the plurality of guide and latch slots are respectively disposed through the main plate; a first sidewall and a second sidewall are fixedly disposed on the main plate respectively, and the serrated mechanism is securely disposed on the first sidewall.

4. The threaded cap opener of claim 3, wherein the first sidewall is provided with a plurality of guide posts disposed fixedly, and the serrated mechanism is guided and mounted on the first sidewall via the plurality of guide posts.

5. The threaded cap opener of claim 3, wherein a first anti-slip member and a second anti-slip member are respectively disposed on the outsides of the first sidewall and the second sidewall, and the first anti-slip member and the second anti-slip member employ anti-slip stripes or anti-slip bumps.

6. The threaded cap opener of claim 1, wherein a receiving slot is disposed on an edge of the through hole, and the second serrated rack is securely disposed in the receiving slot.

7. The threaded cap opener of claim 1, wherein the serrated mechanism comprises two first serrated racks disposed relatively parallel to each other and a connecting plate disposed between the two first serrated racks.

8. The threaded cap opener of claim 1, wherein the fixing plate is securely mounted by screw structures, strong adhesive bonding, snap-fit structures or strong attraction.

9. The threaded cap opener of claim 8, wherein a plurality of first fixing holes are disposed through the fixing plate, and fastening screws pass through the plurality of first fixing holes in sequence to securely mount the fixing plate.

10. A threaded cap opener, comprising:

a fixing plate having a plurality of position-limiting posts fixedly disposed thereon, the fixing plate being an iron member or an iron-containing member; and a cap opening assembly, which is detachably magnetically attached to the fixing plate, wherein the cap opening assembly comprises:

a hand-held plate mechanism, which is a V-shaped body with a V-shaped cavity and has a V-shaped through hole and a plurality of position-limiting holes disposed therethrough respectively, with the plurality of position-limiting posts positioned and latched in the corresponding position-limiting holes respectively;

a serrated mechanism securely disposed along an edge of the hand-held plate mechanism; a second serrated rack securely disposed on an edge of the through hole;

and a magnetic attachment member that is securely disposed in the hand-held plate mechanism and detachably magnetically attached to the fixing plate;

wherein the hand-held plate mechanism comprises a clamping strip, at least one of the serrated mechanism and the magnetic attachment member is secured by the clamping strip.

11. The threaded cap opener of claim 10, wherein the hand-held plate mechanism further comprises a hand-held plate body, wherein the clamping strip securely disposed on the hand-held plate body, and the clamping strip positions and secures the serrated mechanism, and positions and secures the magnetic attachment member received in a receiving cavity of the hand-held plate body.

12. The threaded cap opener of claim 11, wherein the hand-held plate body comprises a V-shaped main plate, and the plurality of guide and latch slots are respectively disposed through the main plate; a first sidewall and a second sidewall are fixedly disposed on the main plate respectively, and the serrated mechanism is securely disposed on the first sidewall.

13. The threaded cap opener of claim 12, wherein the first sidewall is provided with a plurality of guide posts disposed fixedly, and the serrated mechanism is guided and mounted on the first sidewall via the plurality of guide posts.

14. The threaded cap opener of claim 12, wherein a first anti-slip member and a second anti-slip member are respectively disposed on the outsides of the first sidewall and the second sidewall.

15. The threaded cap opener of claim 14, wherein the first anti-slip member and the second anti-slip member employ anti-slip stripes or anti-slip bumps.

16. The threaded cap opener of claim 10, wherein a receiving slot is disposed on an edge of the through hole, and the second serrated rack is securely disposed in the receiving slot.

17. The threaded cap opener according to claim 10, wherein the serrated mechanism comprises two first serrated racks disposed relatively parallel to each other and a connecting plate disposed between the two first serrated racks.

18. The threaded cap opener of claim 10, wherein the fixing plate is securely mounted by screw structures, strong adhesive bonding, snap-fit structures or strong attraction.

19. The threaded cap opener of claim 18, wherein a plurality of first fixing holes are disposed through the fixing plate, and fastening screws pass through the plurality of first fixing holes in sequence to securely mount the fixing plate.

* * * * *